(No Model.) 2 Sheets—Sheet 2.

H. W. HERNS.
MAIL DELIVERY CAB.

No. 585,203. Patented June 29, 1897.

Witnesses
Thos. U. Stewart
Levi F. Cox

Inventor
Henry W. Herns,
By his Attorney
Lucius C. West.

UNITED STATES PATENT OFFICE.

HENRY W. HERNS, OF BATTLE CREEK, MICHIGAN.

MAIL-DELIVERY CAB.

SPECIFICATION forming part of Letters Patent No. 585,203, dated June 29, 1897.

Application filed October 26, 1896. Serial No. 610,115. (No model.)

*To all whom it may concern:*

Be it known that I, HENRY W. HERNS, a citizen of the United States, residing at Battle Creek, in the county of Calhoun, State of Michigan, have invented a new and useful Mail-Delivery Cab, of which the following is a specification.

This invention relates to vehicles used for both collecting and delivering the mail and for other collecting and delivery purposes, same as the other vehicles now in use; but while the above is true my invention is especially adapted for the purposes of handling the mails and has many points in a four-wheeled vehicle making it of especial service to the "mail-carriers," so called.

The object is to produce a mail delivery and collecting cab which in its weight and appearance shall be desirable and which is so braced in connection with a low-down reach and body and otherwise associated with its peculiar running-gear that it will be very rigid in construction in its action against strains and wrenches and still handy and elastic in its use for the purposes intended.

To this end the invention consists in the combination of peculiarly-constructed elements in relation to the body and running-gear, all as more particularly described below and pointed out in the claims.

Figure 1:
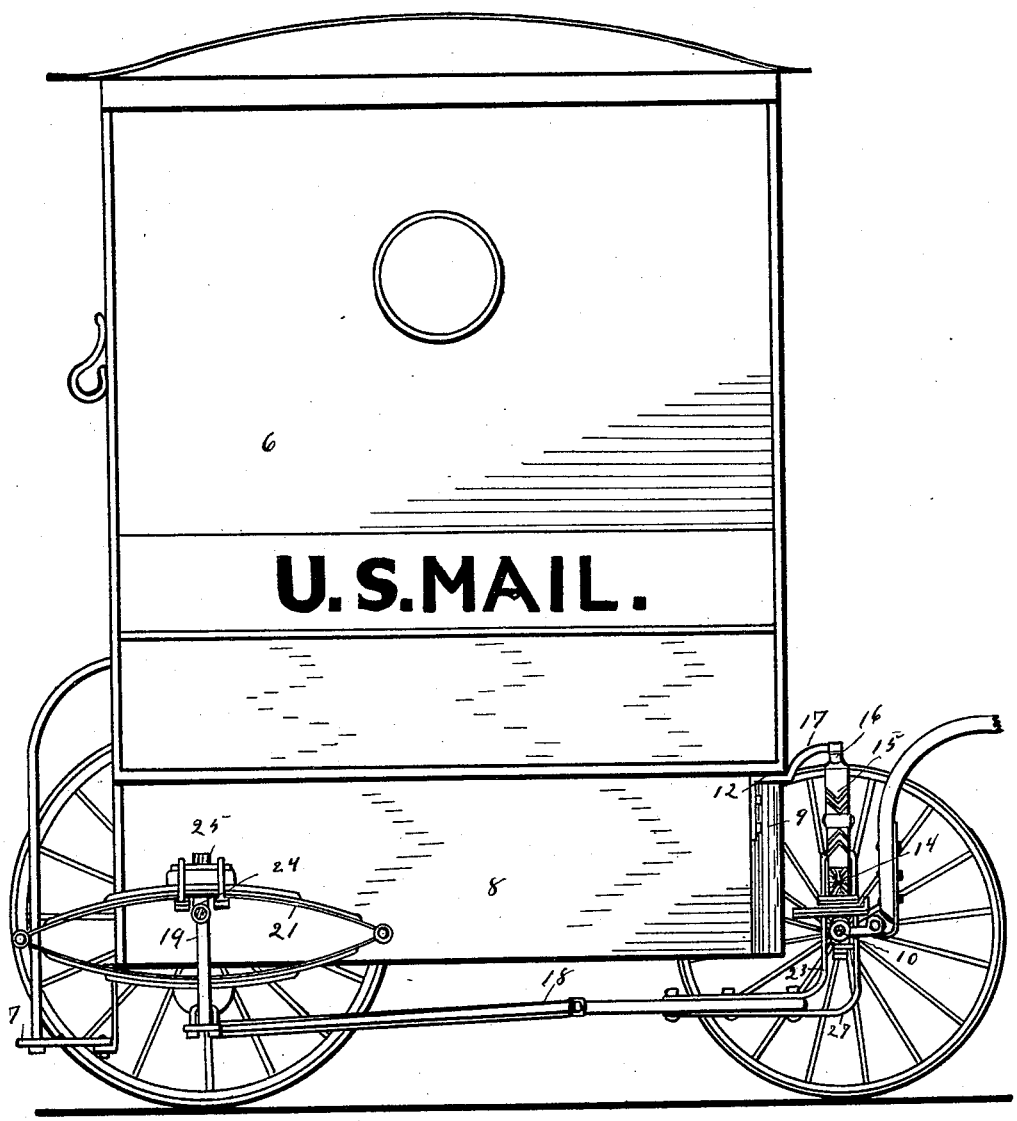
Figure 2:
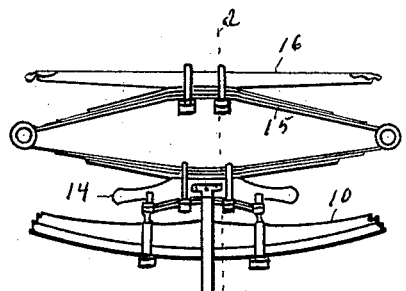
Figure 3:
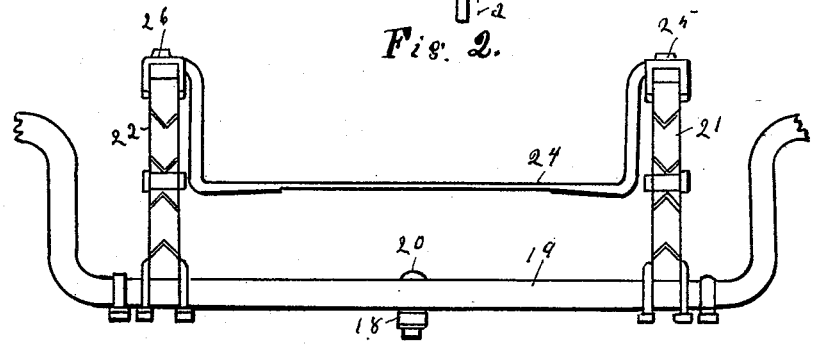
Figure 4:
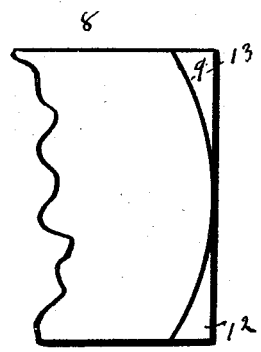
Figure 5:
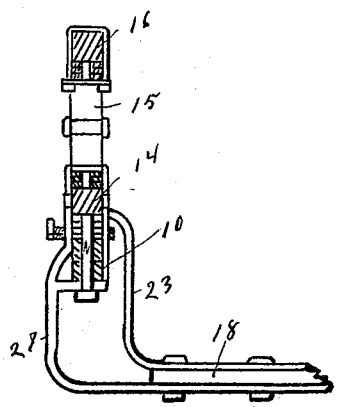

In the drawings forming a part of this specification, Figure 1 is a side elevation of the cab or vehicle with two of the wheels on one side removed; Fig. 2, a broken view showing front axle, the spring above, and connecting parts in elevation, looking from a point at right of Fig. 1; Fig. 3, rear axle enlarged with wheels broken off and showing body-supporting springs and bar above axle; Fig. 4, bottom plan of front end of body; and Fig. 5 is a section enlarged near line *a a* in Fig. 2, looking from a point at the left.

Referring to the parts of the drawings pointed out by numbers, 6 is a rectangular covered body having an entrance in the rear and a step 7 attached to the rear for the purpose of easy access into the body. The body proper has a base portion 8 low down between the wheels, so that a person does not have to step up high to enter the cab. The front end of the base 8 of the body 6 is rounded, as at 9, Figs. 1 and 4, so as to enable the front axle 10, which axle is close to the front end of the body, to turn short in making short turnabout, in order that the cab may turn as short as cabs having the front wheels turning under them. Thus I get my body low down and yet I am able to turn short. Making this curved or rounded portion 9 leaves two shoulders at 12 and 13, Fig. 4. A head-block 14 is mounted on the front axle, an elliptic spring on said head-block at 15, and a bolster 16 on the spring, Fig. 2. The front end of the body is supported on this high-up bolster in a low-down position by employing straps 17, bolted rigid to each end of the bolster 16 and to the shoulders 12 and 13, Figs. 1 and 4.

The body is hung so low that it is necessary to have a low-down reach still below the low body, said reach being shown at 18, Figs. 1 and 5.

I place the rear axle beneath the body 6, but in order to do this I make the axle 19 U form, Fig. 3, so as to bring its main portion low down, and to it I attach the rear end of the reach 18 at 20. On the low-down portion of the axle 18 at the sides of the rear end of the body I attach the elliptic springs 21 and 22. In order to keep the rear end of the body 6 low down in keeping with the front end, I employ a U-bar mounted upon the rear springs, as in Fig. 3, and rigidly attached at 25 and 26. This U-bar 24 is beneath the rear end of the base of the vehicle-body and rigidly attached thereto.

The forward end of the reach is made forked by means of two straps 23 and 27, one on one side and one on the other and one extending up and attached on the inside of the head-block and the other on the outside, as in Figs. 1 and 5. By this means both axles are thoroughly braced by the reach and the body is thoroughly braced on the front bolster and the rear U-bar 24.

Having thus described my invention, what I claim as new, and desire to secure by Letters Patent of the United States, is—

1. The combination of the low-down body, the front and rear axles, the latter U-shaped, a spring on the front axle in front of body and two springs on rear axle one each side of low-down body, a U-bar attaching the base of body to rear springs, and the low-down reach attached to U-axle at rear and having the upwardly-curving fork attaching the reach to the head-block of front axle, substantially as set forth.

2. The combination of the low-down body having base portion with the rounded front end, the front and rear axles, the former near to the rounded end of the base of the body, and the latter U form, a spring on front axle, two springs on rear axle one each side of body, a U-bar beneath the rear end of body and having its ends attached rigidly to the rear springs, and the low-down reach rigidly attached to the rear axle, and having the upwardly-curved fork rigidly attaching the front end of the reach to the head-block, substantially as set forth.

In testimony of the foregoing I have hereunto set my hand in the presence of two witnesses.

HENRY W. HERNS.

Witnesses:
LUCIUS C. WEST,
THOMAS J. ERWIN.